Jan. 10, 1928.
L. BIRKETT
1,656,134
VACUUM OPERATED REGISTER
Filed March 10, 1926
2 Sheets-Sheet 1
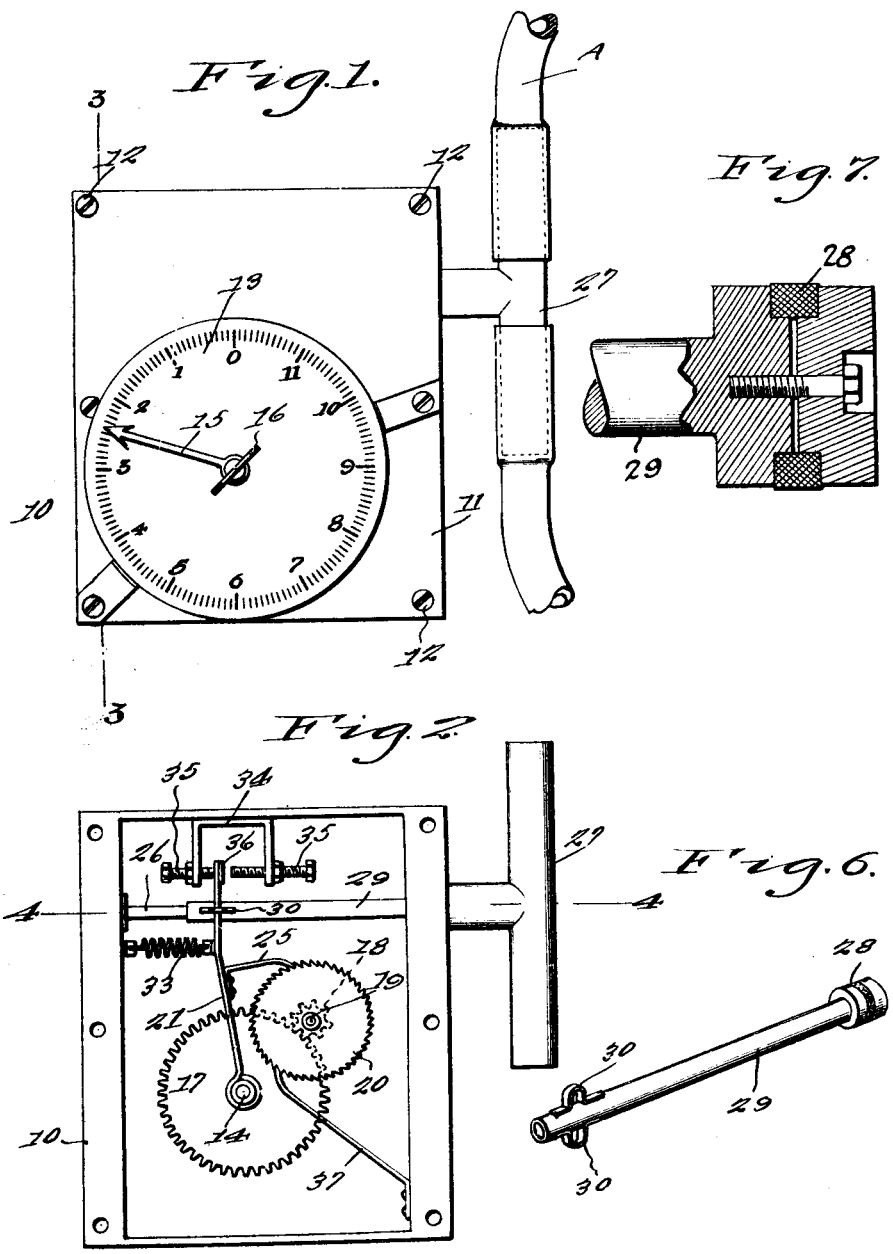
Lynn Birkett INVENTOR
BY Victor J. Evans
ATTORNEY
WITNESS:

Jan. 10, 1928.

L. BIRKETT

VACUUM OPERATED REGISTER

Filed March 10, 1926  2 Sheets-Sheet 2

1,656,134

Lynn Birkett INVENTOR

BY Victor J. Evans
ATTORNEY

WITNESS:

Patented Jan. 10, 1928.

1,656,134

UNITED STATES PATENT OFFICE.

LYNN BIRKETT, OF DOWNSVILLE, WISCONSIN.

VACUUM-OPERATED REGISTER.

Application filed March 10, 1926. Serial No. 93,782.

This invention relates to attachments to or accessories for use in connection with milking machines and has for its object the provision of a novel indicator or register designed for connection with the suction line of a milking machine and operable by the pulsations therein for indicating a number of pulsations, the device constituting a guide as to the length of time, or number of strokes, required for milking a cow.

An important object is the provision of a device of this character which will be of distinct advantage inasmuch as the operator will be enabled to carry on the milking operation for the same length of time at each milking, thereby making the treatment of each cow uniform and avoiding the disadvantages which result from overmilking or undermilking.

A more specific object is the provision of a device of this character which may be made as a complete and separate entity capable of interposition in the suction line and without necessitating any changes in or additions to the milking machine itself or any part of the system, the device being suction operated and including a ratchet mechanism for actuating the movable elements thereof.

An additional object is the provision of a device of this character which will be simple and inexpensive to manufacture, easy to install and adjust, positive in action, efficient and durable in service, and a general improvement in the art.

With the above and other objects and advantages in view, the invention may consist in the details of construction and arrangement of parts to be hereinafter more fully described and claimed, and illustrated in the accompanying drawings in which:

Figure 1 is an elevation of the device,

Figure 2 is a similar view thereof with the cover plate removed,

Figure 6 is a detail perspective view of the piston, Figure 7 is a fragmentary detail section through the piston.

Figure 3:
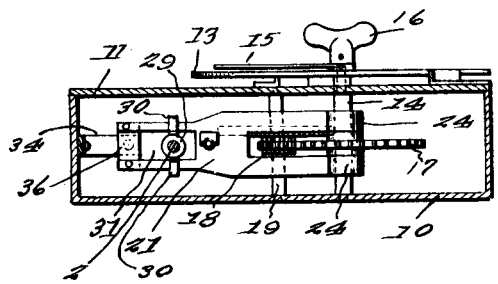
Figure 3 is a cross section taken on the line 3—3 of Figure 1.
Figure 4:
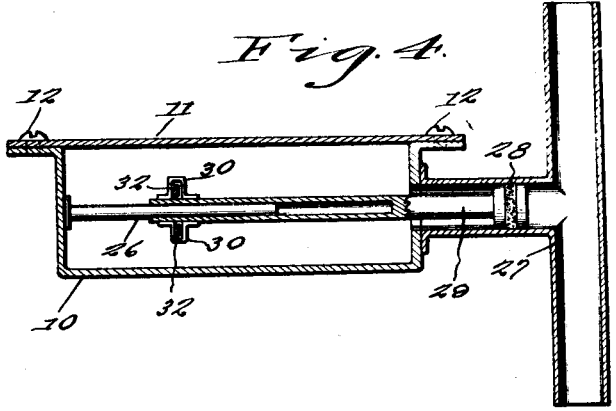
Figure 4 is a cross section taken on substantially the line 4—4 of Figure 2, with the T for the suction line rotated 90 degrees from its position as shown in Figure 2.
Figure 5:
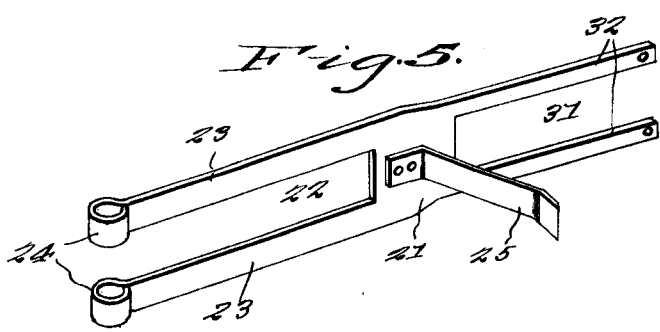
Figure 5 is a detail perspective view of the movable arm.

Referring more particularly to the drawings I have shown the device as comprising a suitable casing 10 of any desired size, shape and detailed construction equipped with a removable cover plate 11 normally held in place by screws or the like 12. This cover is formed with or carries a dial 13 graduated in any desired manner as for instance to indicate the number of strokes of the milking machine or the number of pulsations occurring in the suction line A leading to or from the milking machine.

Journaled transversely of the casing is a shaft 14 carrying a pointer 15 movable over the dial 13 and also carrying a thumb piece or the like 16 whereby the shaft may be turned manually for initially setting the device or resetting it from time to time. The shaft 14 carries a gear 17 meshing with a pinion 18 on a countershaft 19 which is likewise journaled transversely of the casing and which is further equipped with a ratchet 20.

The operating means includes an arm or lever 21 which might, of course, be of any desired specific construction, but which is here shown as having one end bifurcated at 22 to provide arm portions 23 straddling the gear 17 and having their ends coiled or otherwise formed to provide knuckles 24 pivotally engaged upon the shaft 14. Secured upon the intermediate portion of the arm or lever 21 is a spring finger or pawl 25 engaging the ratchet 20.

Suitably secured within the casing is a guide rod 26 arranged in axial alinement with a T 27 which is secured upon one side of the casing. This T is intended to be interposed in the suction line A, a very simple matter inasmuch as the suction line consists of a rubber tube which may be readily cut so that the resultant ends may be engaged upon opposite branches of the T. Slidably mounted within the remaining branch of the T is a piston 28 carried by a piston rod 29 of tubular or socketed formation so as to be slidably engaged upon the guide 26. Obviously, any equivalent structure or mounting may be provided, the details disclosed being merely illustrative. At opposite sides the piston rod is shown as equipped with eyes 30 providing means for connection with the otherwise free end of the lever 21, this end thereof being cut away as at 31 to provide elongated tongues 32 which extend through the eyes 30. A coil spring 33 may be provided connected with the lever 21 for normally holding it at one limit of its movement.

In order that the degree of movement of the lever may be limited and properly adjusted use may be made of a bracket 34 slidably mounted within the casing and carrying opposed adjusting screws 35 between which is located a transverse strip or plate 36 secured across the ends of the tongues 32.

In the operation it will be apparent that at every pulsation in the suction line the piston 28 will move in one direction and subsequently return to its former position upon the cessation of the impulse. At every back and forth movement of the piston the lever 21 which is pivoted on the shaft 14, will move and the pawl 25 carried thereby will turn the ratchet 20 one step. The spring 33 of course acts to return the lever and piston to original position at the end of each suction impulse. To avoid retrograde movement of the ratchet it is preferable to provide a second pawl 37 of ordinary construction. The movement of the ratchet 20 is of course communicated to the gear 17 and shaft 14 so that the pointer 15 will be moved over the dial 13. The ratio of the gear and pinion 17 and 18 respectively may, of course, be made anything desired though it is preferable that the reduction be considerable to avoid too rapid movement of the pointer.

In actual practice the parts are so calculated that the pointer 15 will make one complete revolution when there have been sufficient impulses in the suction line to milk a cow requiring the maximum time.

In the actual use of the device it is apparent that when a cow is milked for the first time a record may be made as to the number of pump strokes or suction impulses necessary, which record will serve as a guide for subsequent milkings. In this way it is quite clear that over or under-milking, with its attendant disadvantages, will be avoided. The device will also be a great time saver inasmuch as the milking operation may be discontinued just as soon as the required number of impulses have been given.

While I have shown and described the preferred embodiment of the invention, it should be understood that I reserve the right to make all such changes in the details of construction and arrangement of parts as will not depart from the spirit of the invention or the scope of the subjoined claims.

Having thus described the invention, I claim:

1. In a device of the character described, a casing, a rotatable element carried by the casing, a shaft operatively connected with said element and carrying a ratchet, a pivoted arm carrying a pawl cooperating with the ratchet, spring means urging said arm in one direction, said arm being bifurcated, a reciprocatory element extending through the bifurcation and cooperating with the arm for moving it against the resistance of said spring, and stop means coacting with the free end of the arm for limiting its movement in both directions.

2. In a device of the character described, a casing, a rotatable element carried by the casing, a shaft operatively connected with said element and carrying a ratchet, a second shaft geared to said shaft, an arm pivoted on said second named shaft and carrying a pawl cooperating with the ratchet, spring means urging said arm in one direction, said arm being bifurcated, a reciprocatory element extending through the bifurcation and cooperating with the arm for moving it against the resistance of said spring, and stop means coacting with the free end of the arm for limiting its movement in both directions, said stop means comprising a U-shaped bracket mounted within the casing and axially alined screws threaded through the arms of the bracket and disposed at opposite sides of the arm in the path of movement thereof.

3. In a device of the character described, a casing, a rotatable element carried by the casing, a shaft operatively connected with said element and carrying a ratchet, a pivoted arm carrying a pawl cooperating with the ratchet, spring means urging said arm in one direction, said arm being bifurcated, a reciprocatory element extending through the bifurcation and cooperating with the arm for moving it against the resistance of said spring, and stop means coacting with the free end of the arm for limiting its movement in both directions, said reciprocatory element having diametrically opposite eyes thereon receiving the arm at opposite sides of the bifurcation therein.

In testimony whereof I affix my signature.

LYNN BIRKETT.